(12) United States Patent
Sudhoff et al.

(10) Patent No.: US 10,305,408 B2
(45) Date of Patent: *May 28, 2019

(54) HYBRID SURFACE MAGNET MACHINE

(71) Applicant: Purdue Research Foundation, West Lafayette, IN (US)

(72) Inventors: Scott Sudhoff, West Lafayette, IN (US); Steve Pekarek, West Lafayette, IN (US); Omar Abdul Laldin, Inglewood, CA (US)

(73) Assignee: Purdue Research Foundation, West LaFayette, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/011,119

(22) Filed: Jun. 18, 2018

(65) Prior Publication Data

US 2019/0020295 A1 Jan. 17, 2019

Related U.S. Application Data

(63) Continuation of application No. 15/693,923, filed on Sep. 1, 2017, now Pat. No. 10,003,291, which is a continuation of application No. 14/668,367, filed on Mar. 25, 2015, now Pat. No. 9,780,715.

(60) Provisional application No. 61/969,894, filed on Mar. 25, 2014.

(51) Int. Cl.
| | |
|---|---|
| *H02K 1/00* | (2006.01) |
| *H02P 23/00* | (2016.01) |
| *H02K 21/04* | (2006.01) |
| *H02K 16/02* | (2006.01) |
| *H02P 25/022* | (2016.01) |
| *H02P 25/024* | (2016.01) |
| *H02P 9/14* | (2006.01) |

(52) U.S. Cl.
CPC ........... *H02P 23/009* (2013.01); *H02K 16/02* (2013.01); *H02K 21/042* (2013.01); *H02P 25/022* (2013.01); *H02P 25/024* (2016.02); *H02P 9/14* (2013.01)

(58) Field of Classification Search
CPC .... H02K 16/02; H02K 21/042; H02K 23/009; H02K 9/14
USPC ................................ 310/181, 156.01–156.84
See application file for complete search history.

(56) References Cited

U.S. PATENT DOCUMENTS

| | | | | |
|---|---|---|---|---|
| 5,663,605 A | * | 9/1997 | Evans | H02K 1/223 174/DIG. 21 |
| 6,072,257 A | * | 6/2000 | Akemakou | H02K 1/22 310/156.55 |

(Continued)

*Primary Examiner* — Hanh N Nguyen
(74) *Attorney, Agent, or Firm* — Purdue Research Foundation

(57) ABSTRACT

A hybrid electrical machine containing surface mounted magnets which includes a magnetically permeable cylindrically shaped stator assembly having at least one stator winding formed about a plurality of stator teeth, a rotor assembly concentrically disposed within the stator assembly, including a magnetically permeable rotor backiron, a rotational drive mechanism coupled to the rotor backiron, and a plurality of protruding rotor poles, each including a magnetically permeable pole support assembly, a winding provided around the pole support assembly, and a radially magnetized permanent magnet assembly disposed about the pole support assembly.

15 Claims, 9 Drawing Sheets

(56) References Cited

U.S. PATENT DOCUMENTS

| | | | | |
|---|---|---|---|---|
| 6,756,870 | B2* | 6/2004 | Kuwahara | H01F 7/06 |
| | | | | 310/105 |
| 10,003,291 | B2* | 6/2018 | Sudhoff | H02K 21/042 |
| 2006/0119206 | A1* | 6/2006 | Akemakou | H02K 21/042 |
| | | | | 310/181 |
| 2010/0207480 | A1* | 8/2010 | Reutlinger | H02K 21/042 |
| | | | | 310/181 |
| 2013/0342066 | A1* | 12/2013 | Taniguchi | H02K 1/28 |
| | | | | 310/156.28 |
| 2014/0077654 | A1* | 3/2014 | Kim | H02K 21/042 |
| | | | | 310/181 |

* cited by examiner

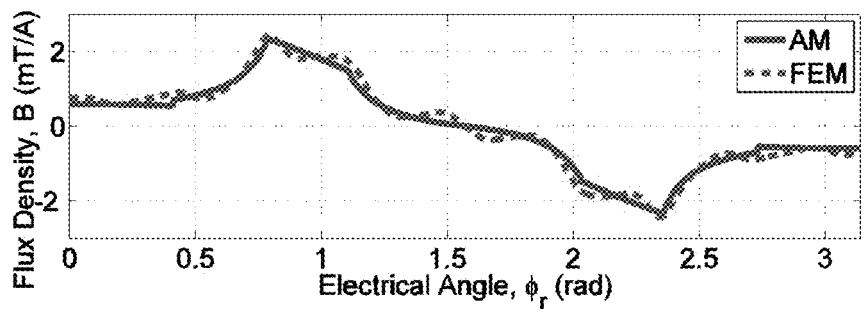
FIG. 6a  a) $i_{qs}^r = 1$ A, $i_{ds}^r = 0$ A, $i_{fd} = 0$ A, and $B_r = 0$ T.
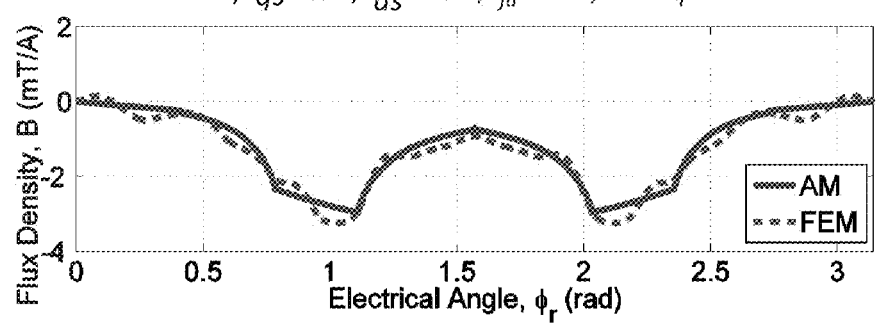
FIG. 6b  b) $i_{qs}^r = 0$ A, $i_{ds}^r = 1$ A, $i_{fd} = 0$ A, and $B_r = 0$ T.
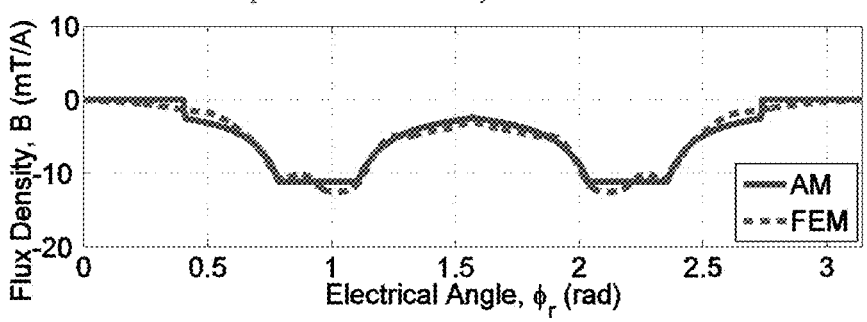
FIG. 6c  c) $i_{qs}^r = 0$ A, $i_{ds}^r = 0$ A, $i_{fd} = 1$ A, and $B_r = 0$ T.
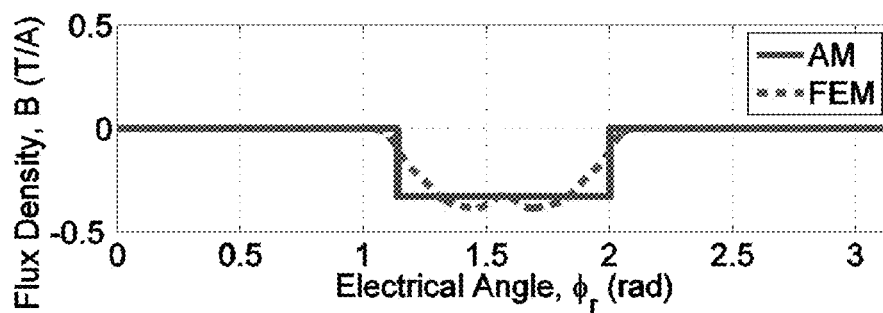
FIG. 6d  d) $i_{qs}^r = 0$ A, $i_{ds}^r = 0$ A, $i_{fd} = 0$ A, and $B_r = 0.63$ T.
FIGs. 6a, 6b, 6c, and 6d

HYBRID SURFACE MAGNET MACHINE

CROSS-REFERENCE TO RELATED APPLICATIONS

The present U.S. patent application is a continuation of U.S. patent application Ser. No. 14/668,367, filed Mar. 25, 2015, which is related to and claims the priority benefit of U.S. Provisional Patent Application Ser. No. 61/969,894, filed Mar. 25, 2014, the contents of which are hereby incorporated by reference in their entirety into the present disclosure.

STATEMENT REGARDING GOVERNMENT FUNDING

This invention was made with government support under N00014-12-1-1020 awarded by the Office of Naval Research. The government has certain rights in the invention.

TECHNICAL FIELD

The present invention generally relates to electric machines and particularly to hybrid electrical machines with permanent magnets and field windings.

BACKGROUND

This section introduces aspects that may help facilitate a better understanding of the disclosure. Accordingly, these statements are to be read in this light and are not to be understood as admissions about what is or is not prior art.

A typical approach to power generation includes use of a wound rotor synchronous machine (WRSM) which can be used for voltage regulation. The same machine may be used as a motor, containing increased flexibility associated to a secondary winding which may be used to regulate output torque. Another type of machine is a permanent magnet synchronous machine (PMSM), which typically offers lower loss and higher power densities.

Referring to FIG. 1, a cross-sectional schematic of an example topology for a hybrid machine is shown. The hybrid machine 1 includes a stator assembly 2 and a rotor assembly 3. The stator assembly 2 includes a stator backiron 4 while the rotor assembly 3 includes a rotor backiron 5. The stator assembly 2 further includes a winding 6, configured to provide a magnetomotive force applicable on the rotor assembly 3. The rotor assembly 3 includes a winding 7 and one or more permanent magnets 8 which together generate a magnetomotive force applicable on the stator assembly 3 which together with the magnetomotive force generated by the stator assembly cause rotation of the rotor assembly 3. The stator assembly 2 and the rotor assembly 3 are radially separated by an air gap 12. The flux produced from the rotor assembly 3 may be approximately modeled using a series circuit configuration depicted in FIG. 1 in a cutout spanning the rotor assembly 3 and the stator assembly 2. Based on the model, a combination of two sources identified as $F_{fd}$ and $F_{pm}$, referring to field windings and permanent magnet magnetomotive force, coupled to each other in series, are connected to a further two reluctances $\mathbb{R}_{pm}$ and $\mathbb{R}_g$, referring to the permanent magnet and air gap, connected to the two supplies also in series. The magnetomotive force sources in the magnetic circuit, dissipated across the reluctances, produce a flux in the air-gap ($\Phi_g$), similar to current in an electric circuit comprised of electromotive force sources (i.e. voltage) and resistances. The series combination is terminated at each end at a ground, representing the stator backiron 4 and the rotor backiron 5.

Placement of magnets and field windings within the rotor is a significant factor in the performance metrics of the hybrid machine, one of which is the torque producing capability relative to the machine size or mass and for a given loss. While beneficial when compared to the mass vs. loss characteristics of the WRSM, there are several limitations inherent in the topology shown in FIG. 1.

Given prior machine configurations, the torques, powers, regulation capability, and the achievable torque density associated therewith, there is unmet need for developing machines with improved torque density, power regulation capability, and lower mass for a given power loss compared to machines of prior art.

SUMMARY

A hybrid electrical machine which includes surface mounted magnets includes a magnetically permeable cylindrically shaped stator assembly having at least one stator winding formed about a plurality of stator teeth, a rotor assembly concentrically disposed within the stator assembly, including a magnetically permeable rotor backiron, a rotational drive mechanism coupled to the rotor backiron, and a plurality of protruding rotor poles, each including a magnetically permeable pole support assembly, a winding provided around the pole support assembly, and a radially magnetized permanent magnet assembly disposed about the pole support assembly.

An energy conversion system is also disclosed. The system includes a mechanical arrangement configured to i) provide mechanical power in a power generation mode, and ii) receive mechanical power in a motoring mode, and a hybrid electrical machine which includes a magnetically permeable cylindrically shaped stator assembly having at least one stator winding formed about a plurality of stator teeth, a rotor assembly concentrically disposed within the stator assembly, including a magnetically permeable rotor backiron, a rotational drive mechanism coupled to the rotor backiron, and a plurality of protruding rotor poles, each including a magnetically permeable pole support assembly, a winding provided around the pole support assembly, and a radially magnetized permanent magnet assembly disposed about the pole support assembly. The mechanical arrangement is coupled to the rotational drive mechanism.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

FIG. 2b is an approximate model schematic, representing the approximate flux producing capability of the rotor, in the hybrid machine of FIG. 2a.

FIGS. 6a-6d are a collection of plots of flux density vs. electrical angle relative to the rotor ($\Phi_r$) for the hybrid machine of FIG. 2a.

FIGS. 6a is a collection of plots of flux density vs. electrical angle relative to the rotor for the hybrid machine of FIG. 2a, in accordance with one or more embodiments.

FIGS. 6b is a collection of plots of flux density vs. electrical angle relative to the rotor for the hybrid machine of FIG. 2a, in accordance with one or more embodiments.

FIGS. 6c is a collection of plots of flux density vs. electrical angle relative to the rotor for the hybrid machine of FIG. 2a, in accordance with one or more embodiments.

FIGS. 6d is a collection of plots of flux density vs. electrical angle relative to the rotor for the hybrid machine of FIG. 2a, in accordance with one or more embodiments.

DETAILED DESCRIPTION

Figure 1:
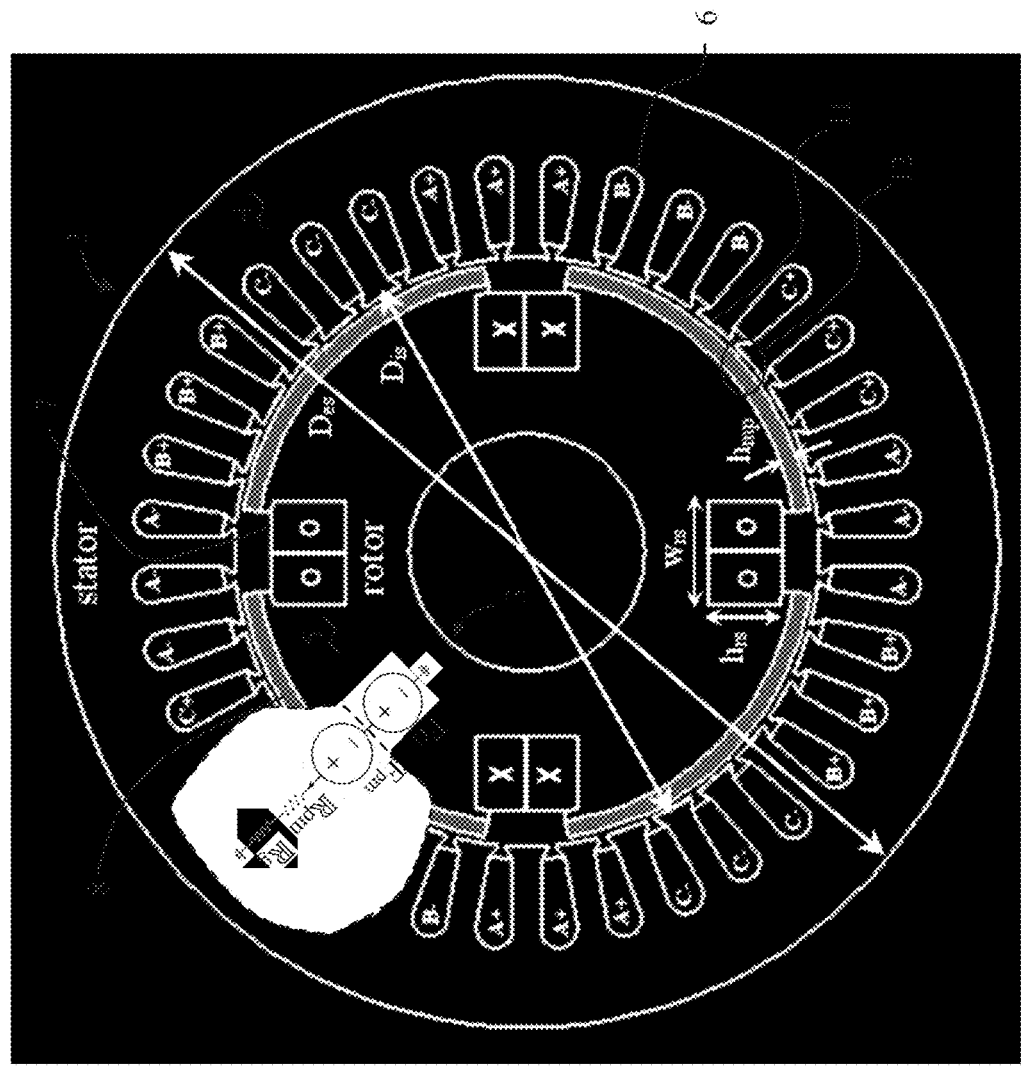
FIG. 1 is a cross sectional view of a typical four-pole hybrid machine configuration found in the prior art.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 2A:
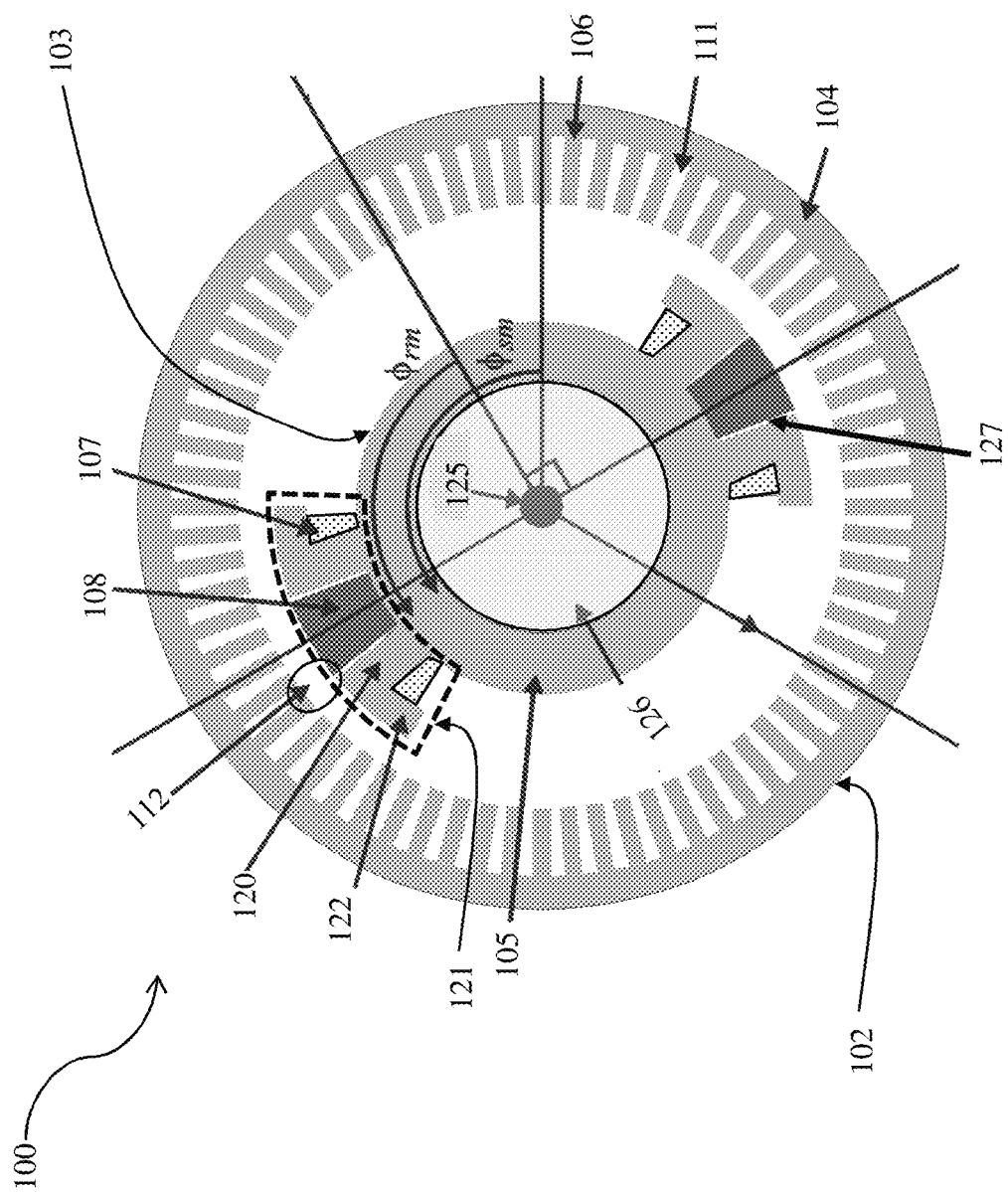
FIG. 2a is a cross sectional schematic view of a hybrid machine with a stator and rotor, according to the present disclosure, wherein the permanent magnets are placed on the rotor between two pole body and pole shoe halves.

A cross sectional schematic representation of one embodiment of a hybrid surface magnet (HSM) machine 100 according to the present disclosure is depicted in FIG. 2a. The HSM 100 includes a stator assembly 102 and a rotor assembly 103. The stator assembly 102 includes a stator backiron 104 while the rotor assembly 103 includes a rotor backiron 105. The stator assembly 102 further includes a distributed winding, configured to provide a magnetomotive force (MMF) applicable on the rotor assembly 103. The rotor assembly 103 is formed in the shape of a cylindrical body, a rotational drive mechanism, in this case a shaft 125 positioned at the center of the rotor assembly 103, coupled to the rotor backiron 105 by an inert rotor material 126 and configured to rotate along with the rotor backiron 105, and a plurality of outwardly protruded magnetically permeable pole assemblies 121 which include field windings 107 and one or more radially magnetized permanent magnets 108 which together generate a magnetomotive force applicable on the stator assembly 103 and which together with the magnetomotive force generated by the stator assembly 102 cause rotation of the rotor assembly 103. The stator assembly 102 and the rotor assembly 103 are radially separated by an air gap 112. Each of the pole assemblies includes pole bodies 120 and pole shoes 122 surrounding the one or more permanent magnets 108 with spacers 127 between them.

The HSM 100 includes a conventional distributed winding based stator assembly 102. The stator assembly 102 includes a plurality of teeth 106 inwardly protruded towards the center of the machine 100 along the radial direction, formed at predetermined intervals represented by slots 111 along the circumferential direction. The stator assembly 102 is configured to have a winding that can be placed in the stator slots 111.

Figure 2B:
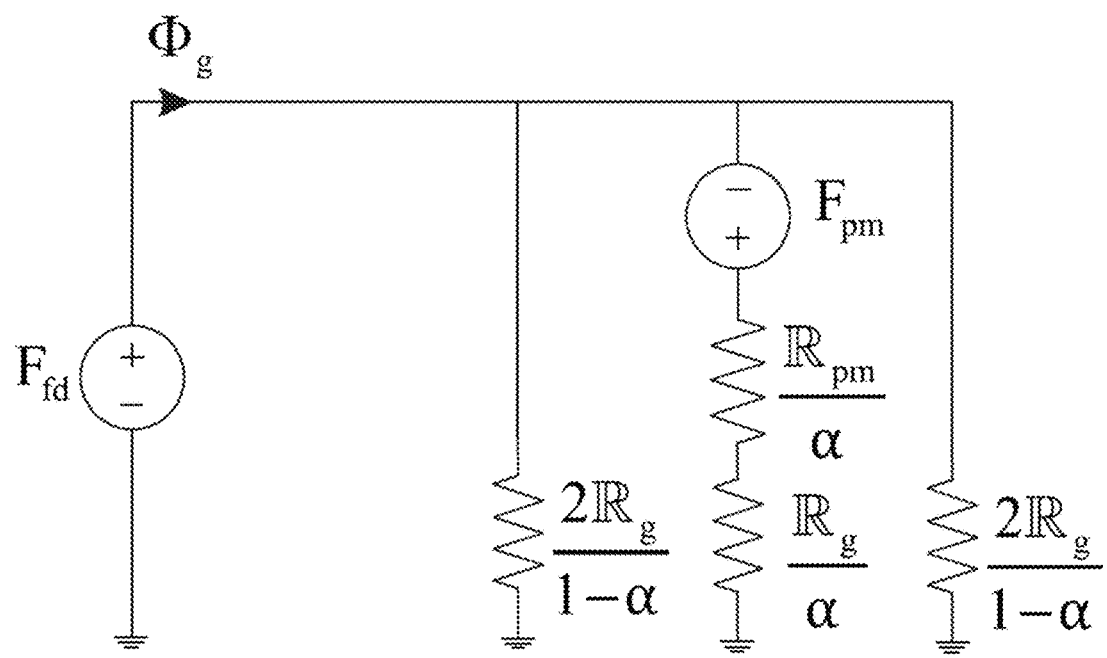

The flux from the rotor assembly 103 may be approximately modeled using a parallel circuit configuration depicted in FIG. 2b. Based on the model, a source identified as Ffd, referring to the magnetomotive force associated with the field windings 107 is in series coupling with a parallel network which includes another source identified as $F_{pm}$, referring to the magnetomotive force associated with the one or more permanent magnets 108, and further two reluctances $\mathbb{R}_{pm}$ and $\mathbb{R}_g$, referring to the permanent magnet and air gap. The magnetomotive force sources in the magnetic circuit, dissipated across the reluctances, produce a flux ($\Phi_g$), similar to current in an electric circuit comprised of electromotive force sources (i.e. voltage) and resistances. The source identified as $F_{fd}$ terminates at a ground associated with the rotor backiron 105 while the parallel network is terminated at a ground associated with the stator backiron 104. The percentage of the rotor pole 121 facing the air-gap 112 is represented by the factor $\alpha$. The flux crossing the air-gap ($\Phi_g$) is related to torque density.

The permanent magnets 108 allow the rotor assembly 103 to produce either voltage or torque with minimal losses as compared to those associated with excitation of the field winding 107. At higher loads in generating mode, the field windings 107 are excited to account for the resulting voltage drops and regulate the output. At higher loads in motoring mode, the field windings 107 are excited to produce additional flux, resulting in additional torque. At higher speeds (in both motoring and generating modes), the field windings 107 are excited in the reverse direction to provide field weakening capability, allowing for power regulation. The shape of the stator and rotor steel, as well as the placement of the MMF sources in the topologies explored allows the air-gap flux distribution to be manipulated, wherein the electromechanical energy conversion process occurs. Adequate placement of steel, magnets, spacers, and windings allows the flux to be distributed such that the flux linking the stator winding is maximized.

Figure 3:
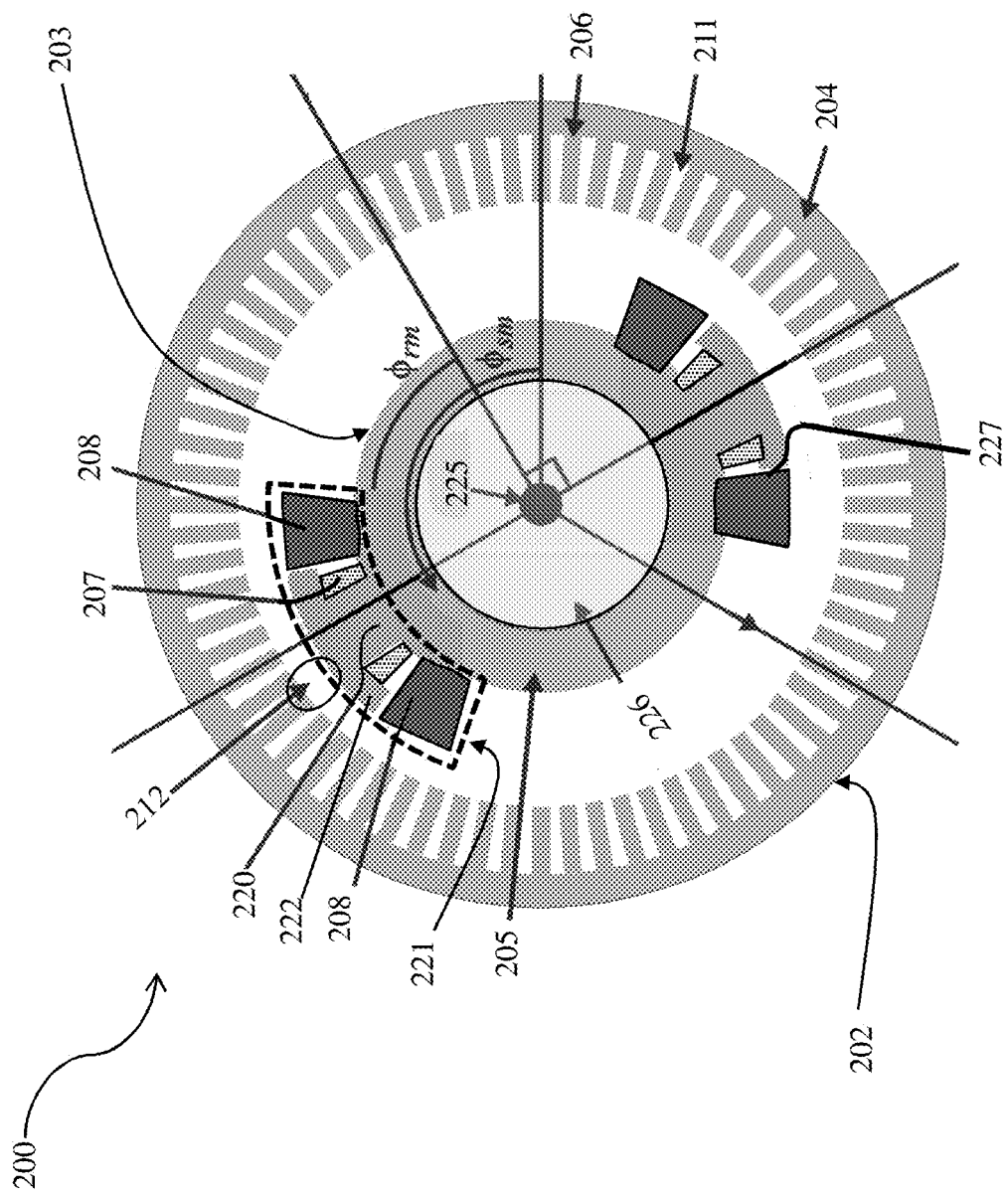
FIG. 3 is a cross sectional schematic view of another embodiment of hybrid machine according to the present disclosure.

Referring to FIG. 3, a cross sectional schematic representation of another embodiment of the HSM 200 is depicted. The HSM 200 includes a stator assembly 202 and a rotor assembly 203. The stator assembly 202 includes a stator backiron 204 while the rotor assembly 203 includes a rotor backiron 205. The stator assembly 202 further includes a winding, configured to provide a magnetomotive force applicable on the rotor assembly 203. The rotor assembly 203 is formed in the shape of a cylindrical body, a rotational drive mechanism, in this case a shaft 225 positioned at the center of the rotor assembly 203, coupled to the rotor backiron 205 by an inert rotor material 226 and configured to rotate along with the rotor backiron 205, and a plurality of outwardly protruded magnetically permeable pole assemblies 221 which include field windings 207 and one or more radially magnetized permanent magnets 208 which together generate a magnetomotive force applicable on the stator assembly 203 and which together with the magnetomotive force generated by the stator assembly 202 cause rotation of the rotor assembly 203. The stator assembly 202 and the rotor assembly 203 are radially separated by an air gap 212. Each of the pole assemblies includes pole bodies 220 and pole shoes 222 surrounding the one or more permanent magnets 208 with spacers 227 between them.

Each of the plurality of poles assemblies 221 contains a T-shaped magnetically permeable pole support assembly, which includes a pole body 220 and a pole shoe 222, a radially magnetized permanent magnet assembly, which includes permanent magnets 208 and spacers 227, and field winding 207 made of conductive materials. The permanent magnets 208 are placed about the T-shaped pole support assembly, separated via the spacers 227. The permanent magnets 208 are magnetized in the radial direction. The field windings 207 is coiled around the pole support assembly.

The permanent magnets 208 allow the rotor assembly 203 to produce either voltage or torque with minimal losses as compared to those associated with excitation of the field winding 207. At higher loads in generating mode, the field windings 207 are excited to account for the resulting voltage drops and regulate the output. At higher loads in motoring mode, the field windings 207 are excited to produce additional flux, resulting in additional torque. At higher speeds (in both motoring and generating modes), the field windings 207 are excited in the reverse direction to provide field weakening capability, allowing for power regulation. The shape of the stator and rotor steel, as well as the placement of the MMF sources in the topologies explored allows the air-gap flux distribution to be manipulated, wherein the electromechanical energy conversion process occurs. Adequate placement of steel, magnets, spacers, and windings allows the flux to be distributed such that the flux linking the stator winding is maximized.

Figure 4:
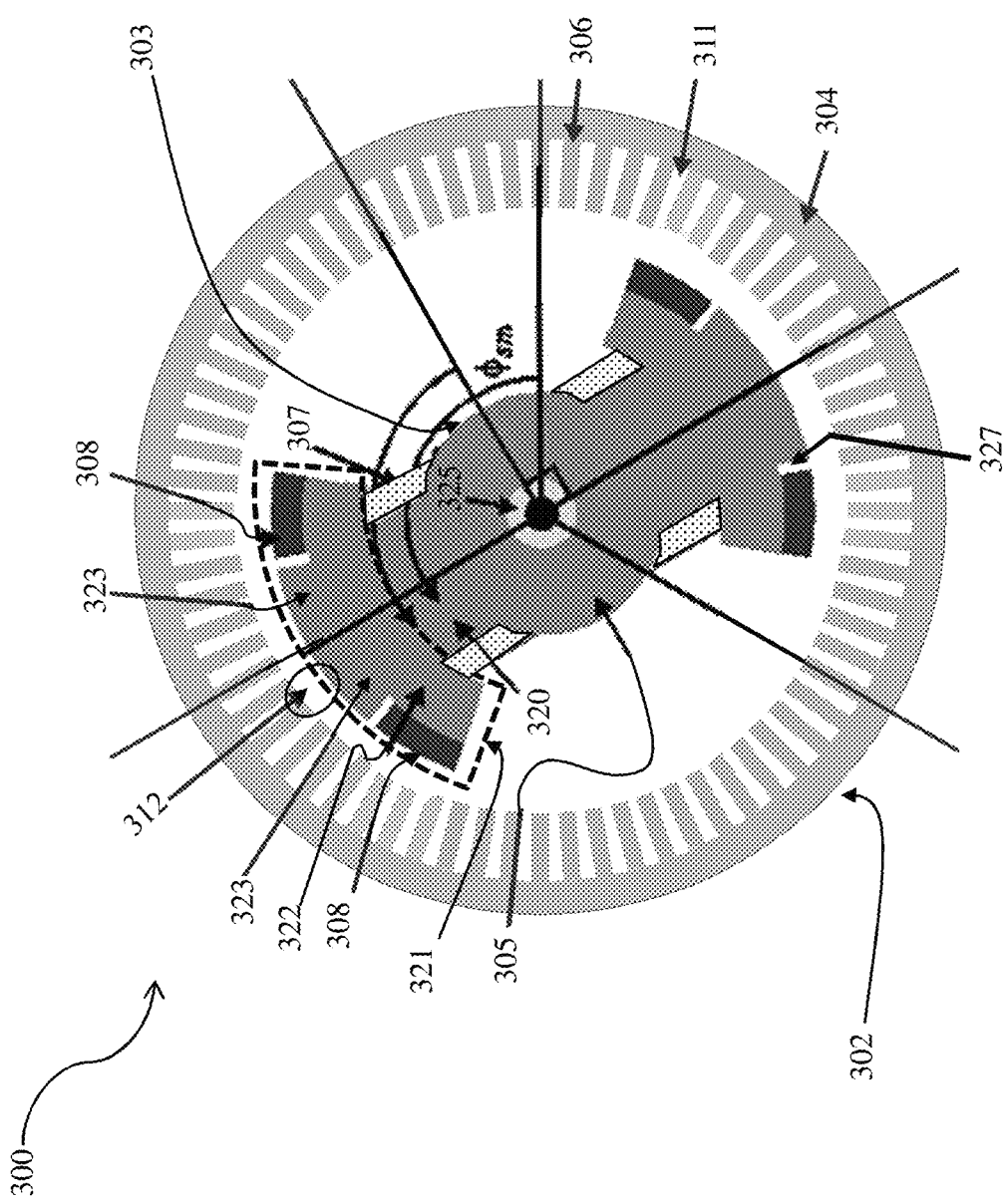
FIG. 4 is a cross sectional schematic view of another embodiment of hybrid machine according to the present disclosure.

Referring to FIG. 4, a cross sectional schematic representation of another embodiment of the HSM 300 is depicted. The HSM 300 includes a stator assembly 302 and a rotor assembly 303. The stator assembly 302 includes a stator backiron 304 while the rotor assembly 303 includes a rotor backiron 305. The stator assembly 302 further includes a winding, configured to provide a magnetomotive force applicable on the rotor assembly 303. The rotor assembly 303 is formed in the shape of a cylindrical body, a rotational drive mechanism, in this case a shaft 325 positioned at the center of the rotor assembly 303, coupled to the rotor backiron 305 and configured to rotate along with the rotor backiron 305, and a plurality of outwardly protruded magnetically permeable pole assemblies 321 which include field windings 307 and one or more radially magnetized permanent magnets 308 which together generate a magnetomotive force applicable on the stator assembly 303 and which together with the magnetomotive force generated by the stator assembly 302 cause rotation of the rotor assembly 303. The stator assembly 302 and the rotor assembly 303 are radially separated by an air gap 312. Each of the pole assemblies includes pole bodies 320 and pole shoes 322 surrounding the one or more permanent magnets 308 with spacers 327 between them.

Each of the plurality of poles assemblies 321 contains a T-shaped magnetically permeable pole support assembly, which includes a pole body 320, a pole tip 323, and a pole shoe 322, a radially magnetized permanent magnet assembly, which includes permanent magnets 308 and spacers 327, and field winding 307 made of conductive materials. The permanent magnets 308 are placed about the T-shaped pole support assembly, separated via the spacers 327. The permanent magnets 308 are magnetized in the radial direction. The field winding 307 is coiled around the pole support assembly.

The permanent magnets 308 allow the rotor assembly 303 to produce either voltage or torque with minimal losses as compared to those associated with excitation of the field winding 307. At higher loads in generating mode, the field windings 307 are excited to account for the resulting voltage drops and regulate the output. At higher loads in motoring mode, the field windings 307 are excited to produce additional flux, resulting in additional torque. At higher speeds (in both motoring and generating modes), the field windings 307 are excited in the reverse direction to provide field weakening capability, allowing for power regulation. The shape of the stator and rotor steel, as well as the placement of the MMF sources in the topologies explored allows the air-gap flux distribution to be manipulated, wherein the electromechanical energy conversion process occurs. Adequate placement of steel, magnets, spacers, and windings allows the flux to be distributed such that the flux linking the stator winding is maximized.

Figure 5:
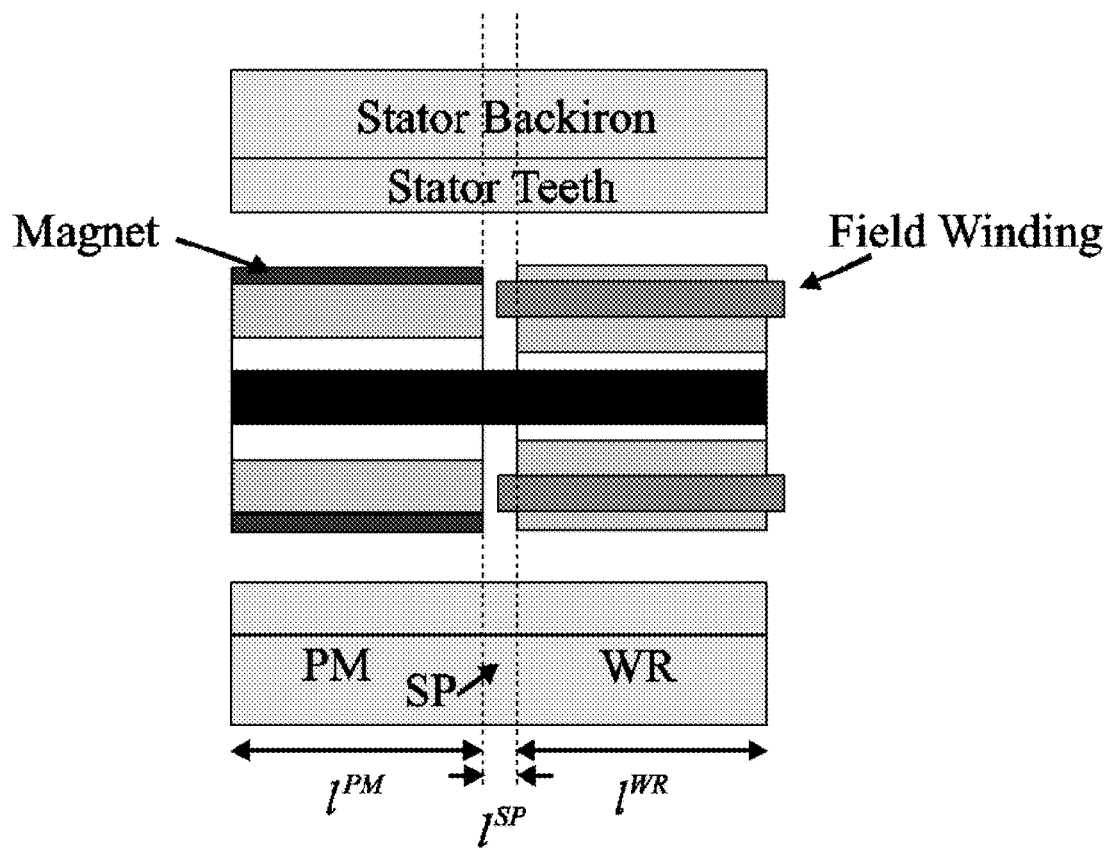
FIG. 5 is a cross sectional schematic view of another hybrid machine.

FIG. 5 is a schematic view of yet another hybrid machine topology that was explored, containing a stator and two rotors mechanically coupled via a common shaft, wherein a first rotor contains a backiron section, a pole shoe, pole body, and field winding, and a second rotor contains permanent magnets on the surface of the rotor backiron. The topology is used, among others, to compare the relative benefits of the hybrid machine presented in this disclosure.

FIGS. 6a-6d are a collection of plots of flux density vs. electrical angle relative to the rotor ($\Phi_r$) for the hybrid machine according to one embodiment of the present disclosure (see FIG. 2a). The plotted flux densities are obtained using an analytical model (AM) and a finite element model (FEM), and include profiles resulting due to excitation of the a) q-axis, b) d-axis, c) field winding, and d) magnet. Typically, in the analysis of electric machinery, the fringing flux, resulting in the curved regions of a)-c), are ignored. For the hybrid machine HSM 100 of the present disclosure, ignoring the flux in these regions results in generally underestimating the associated flux linkages, and particularly that resulting from the field winding, used to regulate the output voltage in generation mode, or allowing for an additional parameter to regulate output torque in motoring mode. As a result, the benefits of the embodiment of FIG. 2a, containing a magnet, with a lower relative permeability than that of the rotor steel, in the center of the pole assembly 121, are not immediately obvious.

Figure 7:
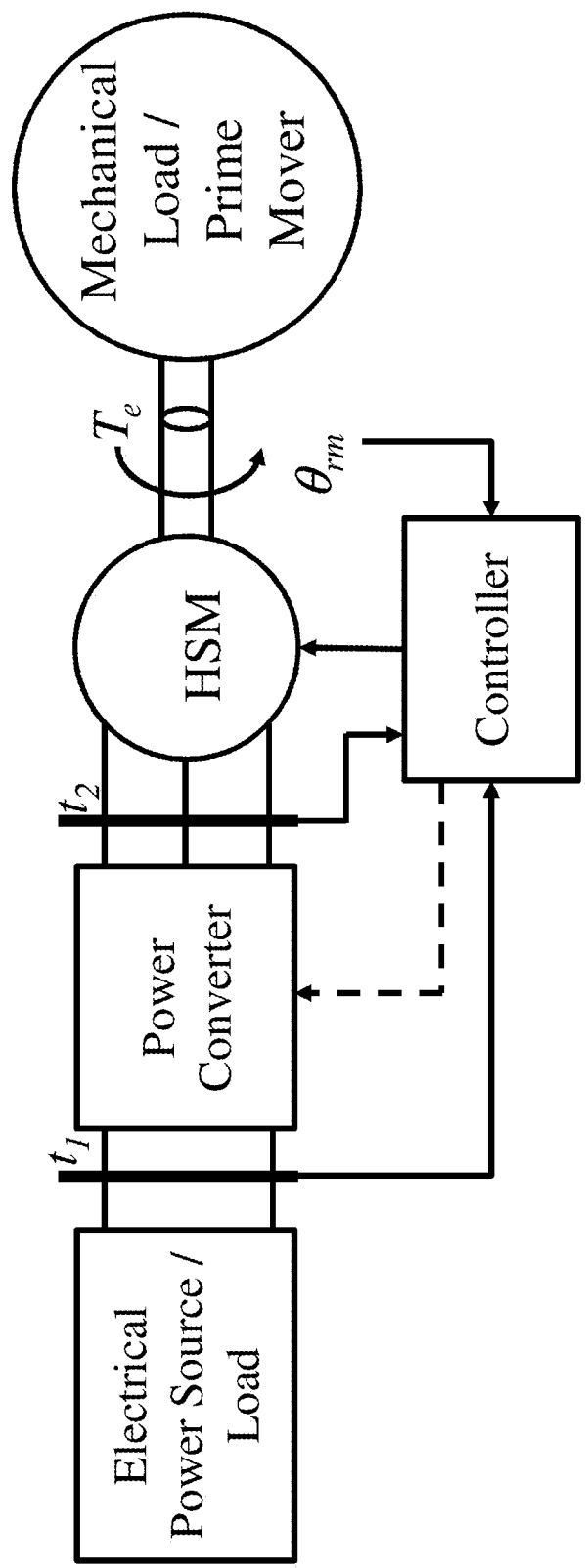
FIG. 7 is a block diagram of the components used in a power system to deliver power to a mechanical load in a motoring mode, or an electrical load in generating mode.

The hybrid machines HSM 100, 200, and 300 may be operated as part of an energy conversion system shown in FIG. 7. Referring to FIG. 7, the system includes a mechanical arrangement that i) provides electrical power in generation mode or ii) receives electrical power in motoring mode, a hybrid electrical machine, a power converter, a controller, a position sensor (or estimator), and an electrical power i) load in generation mode or ii) source in motoring mode. The rotor position of the machine, the voltage and/or current at terminal $t_1$, and/or the voltage and/or current at terminal $t_2$ are detected and used as a feedback to the controller to determine the appropriate field winding voltage and/or current. A position estimator can also be used to estimate position of the rotor and use the estimated position of the rotor as a feedback signal in a similar manner.

Referring to FIG. 7, the system operating in power generation mode includes an electrical load, which is one of a single-phase alternating power load, a multi-phase alternating power load, a direct current power load, and other loads known to a person having ordinary skill in the art.

Referring to FIG. 7, the system operating in motoring mode includes an electrical power source, which is one of a single-phase alternating power source, a multi-phase alternating power source, a direct current power source, and other sources known to a person having ordinary skill in the art.

Referring to FIG. 7, the power converter may be operating in AC/AC mode or AC/DC mode, with one AC side coupled to the electrical connection of the hybrid electrical machine. The converter is comprised of a plurality of switching devices, which may be of various types, including passive switches (e.g. diodes), semi-active switches (e.g. thyristors), and active switches (e.g. IGBTs). If semi-active or active switches are used, a controller is configured to provide the required control signals.

Figure 8:
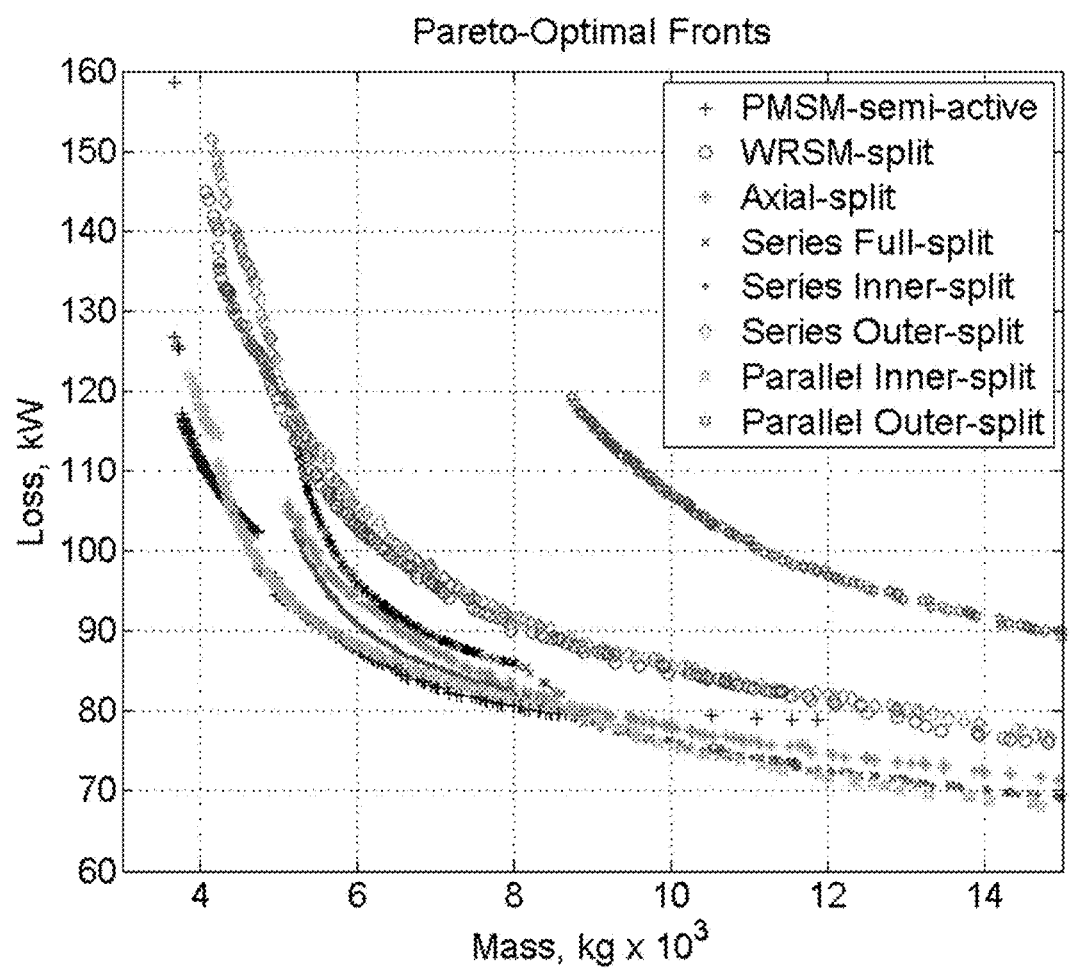
FIG. 8 is a plot of the loss vs. mass, for the hybrid machines according to the present disclosure and traditional PMSM and WRSM machines found in the prior art.

In FIG. 8, the Pareto-optimal fronts, providing the mass vs. loss characteristic, known to a person of ordinary skill in the art, of several hybrid machine topologies, as well as of a WRSM and PMSM, are shown. Each machine topology is optimized to minimize loss and mass for a given output power. The computation of this characteristic is repeated twice for each machine to check for consistency. From the Pareto-optimal front comparison in FIG. 8, the HSM 100 topology (referred in the figure as parallel-inner-split) is shown to have a better tradeoff than the WRSM and comparable to that of a PMSM.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A machine comprising:
a rotor assembly concentrically disposed within a stator assembly, the rotor assembly comprising
a rotor backiron;
a drive mechanism coupled to the rotor backiron and configured to rotate in association with the rotor backiron, and
a plurality of rotor poles, each rotor pole comprising
a pole support assembly,
a winding provided around the pole support assembly, and
a magnet assembly disposed about the pole support assembly,
wherein the pole support assembly includes a T-shaped pole support, and
wherein the magnet assembly comprises a plurality of permanent magnets, wherein each permanent magnet of the plurality of permanent magnets is on each side of the T-shaped pole support, wherein the each permanent magnet of the plurality of permanent magnets is not in physical contact with the T-shaped pole support.

2. The machine of claim 1, further comprising a spacer between each permanent magnet of the plurality of permanent magnets and the T-shaped pole support.

3. The machine of claim 1, wherein the T-shaped pole support includes side bars.

4. The machine of claim 1, wherein the rotor backiron is in a shape of a cylindrical body.

5. A machine comprising:
a rotor assembly concentrically disposed within a stator assembly, the rotor assembly comprising
a drive mechanism coupled to a rotor backiron, and
a plurality of rotor poles, wherein each rotor pole comprises
a magnet assembly disposed about a pole support assembly,
wherein the pole support assembly includes a T-shaped pole support, and
wherein the magnet assembly comprises a plurality of permanent magnets, wherein each permanent magnet of the plurality of permanent magnets is on each side of the T-shaped pole support, wherein the each permanent magnet of the plurality of permanent magnets is physically disjointed with the T-shaped pole support.

6. The machine of claim 5, further comprising a spacer between each permanent magnet of the plurality of permanent magnets and the T-shaped pole support.

7. The machine of claim 5, wherein the drive mechanism is configured to rotate in association with the rotor backiron.

8. The machine of claim 5, wherein the rotor backiron is in a shape of a cylindrical body.

9. The machine of claim 5, further comprising a winding around the pole support assembly.

10. The machine of claim 5, wherein the T-shaped pole support includes side bars.

11. A machine comprising:
a rotor assembly disposed within a stator assembly, wherein the rotor assembly comprises:
a rotational drive mechanism coupled to a rotor backiron, and
a plurality of rotor poles, wherein each rotor pole comprises
a pole support assembly, wherein the pole support assembly comprises a pole body and a pole shoe, wherein the pole shoe comprises a plurality of recesses, and
a plurality of permanent magnets, wherein each permanent magnet of the plurality of permanent magnets is over each recess of the plurality of recesses of the pole shoe.

12. The machine of claim 11, further comprising a spacer between each permanent magnet of the plurality of permanent magnets and a sidewall of a respective recess of the plurality of recesses.

13. The machine of claim 11, wherein the drive mechanism is configured to rotate in association with the rotor backiron.

14. The machine of claim 11, wherein the rotor backiron is in a shape of a cylindrical body.

15. The machine of claim 11, further comprising a winding around the pole support assembly.

* * * * *